(12) United States Patent
Rosenberg et al.

(10) Patent No.: US 11,692,571 B2
(45) Date of Patent: Jul. 4, 2023

(54) CLIP ASSEMBLY FOR HOLDING A COMPONENT DURING A VEHICLE ASSEMBLY/DISASSEMBLY PROCESS

(71) Applicant: Volvo Car Corporation, Gothenburg (SE)

(72) Inventors: Johan Rosenberg, Lerum (SE); Sebastian Rutelin, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 526 days.

(21) Appl. No.: 16/377,306

(22) Filed: Apr. 8, 2019

(65) Prior Publication Data

US 2020/0318670 A1 Oct. 8, 2020

(51) Int. Cl.
*F16B 5/06* (2006.01)
*F16B 21/06* (2006.01)

(52) U.S. Cl.
CPC ............ *F16B 5/0664* (2013.01); *F16B 21/06* (2013.01)

(58) Field of Classification Search
CPC .... F16B 2/22; F16B 2/24; F16B 2/241; F16B 2/243; F16B 5/0614; F16B 5/0664;
(Continued)

(56) References Cited

U.S. PATENT DOCUMENTS 3,959,852 A * 6/1976 Sasena .................... E04H 17/12
256/47
4,394,054 A * 7/1983 Nieboer ................... H04N 5/65
348/E5.131
(Continued)

FOREIGN PATENT DOCUMENTS

CN 107949708 A 4/2018
CN 108930697 A * 12/2018 ............. B61D 17/04
(Continued)

OTHER PUBLICATIONS

May 26, 2020 European Search Report issued on International Application No. 20167689.
(Continued)

*Primary Examiner* — Amber R Anderson
*Assistant Examiner* — Zachary A Hall
(74) *Attorney, Agent, or Firm* — Clements Bernard Walker; Christopher L. Bernard

(57) ABSTRACT

A clip assembly for holding a component during a vehicle assembly/disassembly process. This clip assembly includes a clip structure coupled to one of a component and an associated structure of a vehicle and a corresponding receptacle structure manufactured into the other of the component and the associated structure of the vehicle. When the clip structure is engaged with the corresponding receptacle structure, the clip assembly holds the component with respect to the associated structure along three (orthogonal) axes, preventing translation of the component with respect to the associated structure in one or both directions along each axis. Along one of the axes, the engagement of the clip structure with the corresponding receptacle structure can be overcome by the application of a sufficiently high force to the component, thereby disengaging the clip structure from the corresponding receptacle structure and the component from the associated structure.

17 Claims, 9 Drawing Sheets

(58) Field of Classification Search
CPC .............. F16B 2200/20; F16B 21/075; Y10T 403/1608; Y10T 403/53; Y10T 403/59; Y10T 403/60; Y10T 403/7176; Y10T 24/44026; B60R 11/00; B60R 13/0206
See application file for complete search history.

(56) References Cited

U.S. PATENT DOCUMENTS

| | | | | |
|---|---|---|---|---|
| 4,468,067 | A * | 8/1984 | Jenkins | F16B 12/32 403/252 |
| 4,867,599 | A * | 9/1989 | Sasajima | B62D 1/16 403/338 |
| 5,921,530 | A * | 7/1999 | Joyce | F16G 11/00 256/48 |
| 5,934,729 | A | 8/1999 | Baack | |
| 6,394,695 | B1 * | 5/2002 | Chausset | F16B 5/065 403/397 |
| 7,275,289 | B2 * | 10/2007 | Lipniarski | B29C 49/54 24/297 |
| 7,789,376 | B2 * | 9/2010 | Diamond | E04H 17/161 256/56 |
| 9,644,653 | B2 * | 5/2017 | Reiter | F16B 5/0016 |
| 10,202,777 | B1 * | 2/2019 | Leavey | F16B 5/07 |
| 2002/0125705 | A1 | 9/2002 | Wong et al. | |
| 2005/0217083 | A1 | 10/2005 | Tashima et al. | |
| 2006/0197317 | A1 | 9/2006 | Watanabe | |
| 2012/0315080 | A1 * | 12/2012 | Zink | A61B 5/055 403/110 |
| 2014/0208561 | A1 | 7/2014 | Colombo et al. | |
| 2016/0115979 | A1 * | 4/2016 | Kwon | E05B 85/12 248/220.31 |
| 2017/0030389 | A1 * | 2/2017 | Abboud | F16B 21/086 |
| 2019/0178419 | A1 * | 6/2019 | Vaccaro | F16L 3/133 |
| 2019/0387951 | A1 * | 12/2019 | Nearpass | A47L 15/4259 |

FOREIGN PATENT DOCUMENTS

| | | | | |
|---|---|---|---|---|
| DE | 19714356 | A1 | 4/1998 | |
| DE | 19923641 | A1 * | 11/2000 | ............ F16B 5/0076 |
| DE | 102009033129 | A1 | 7/2010 | |
| DE | 102011016647 | A1 * | 10/2012 | ............ F16B 21/075 |
| DE | 102013011527 | A1 | 1/2015 | |
| DE | 102013021314 | A1 * | 6/2015 | ............. F16B 5/125 |
| EP | 1493653 | A1 | 1/2005 | |
| EP | 3360752 | A1 * | 8/2018 | ............... B61D 17/04 |
| GB | 2245019 | A * | 12/1991 | ................ F16B 2/22 |
| WO | WO-2013149689 | A1 * | 10/2013 | ............ F16B 5/0614 |
| WO | WO-2014019773 | A1 * | 2/2014 | ............. F16B 2/241 |
| WO | 2017004322 | A1 | 1/2017 | |

OTHER PUBLICATIONS

Nov. 14, 2022 Second Office Action issued in corresponding Chinese Patent Application No. 202010268052.2.

* cited by examiner

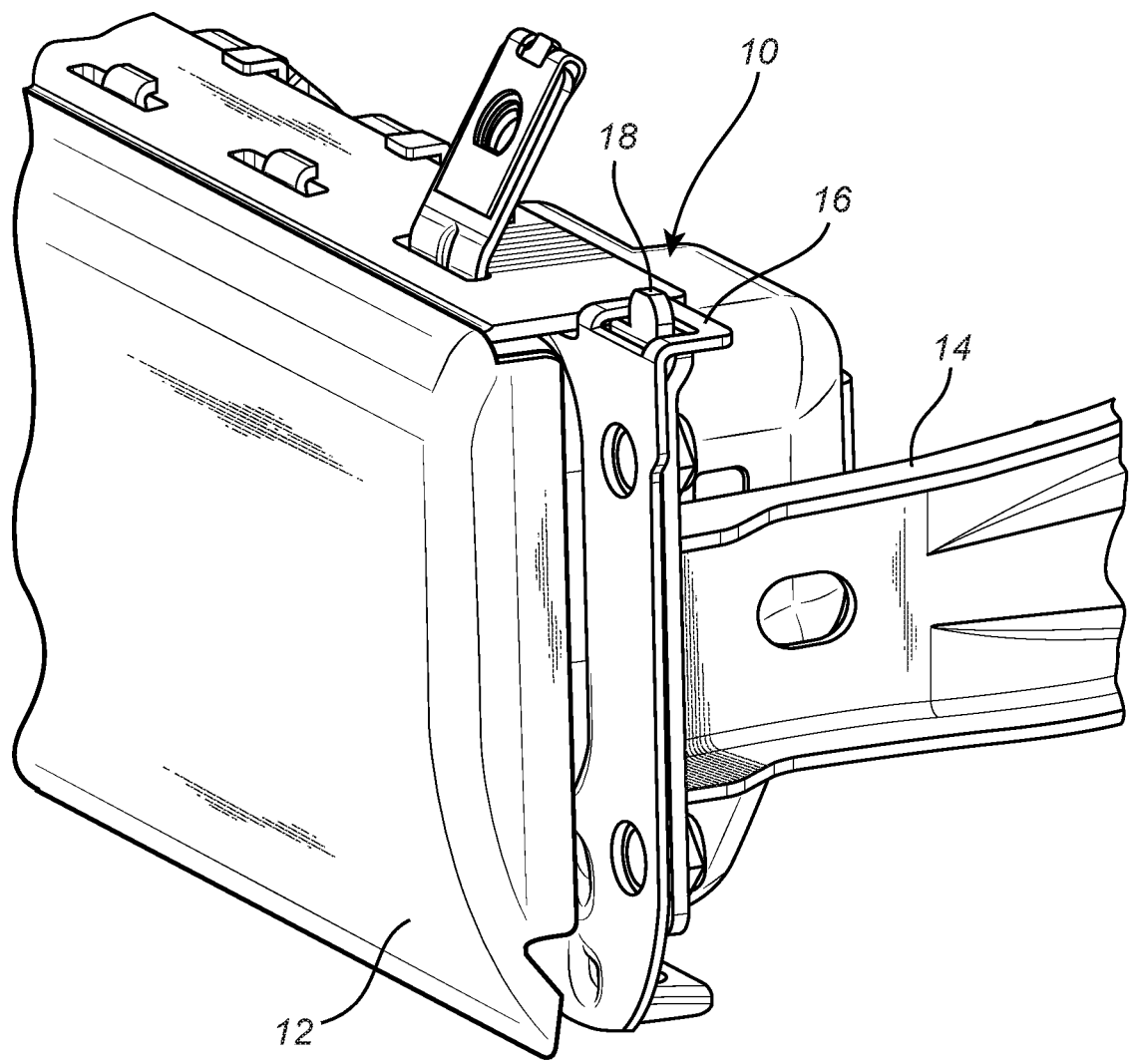
(Prior Art) Fig. 1

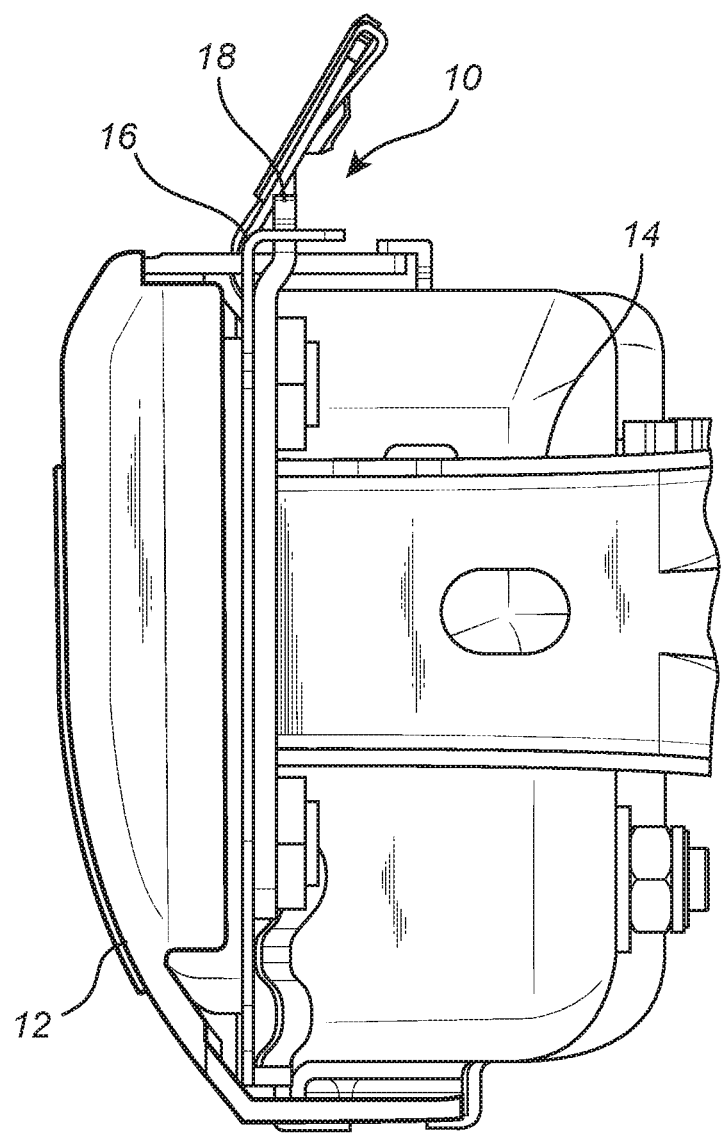
(Prior Art) Fig. 2

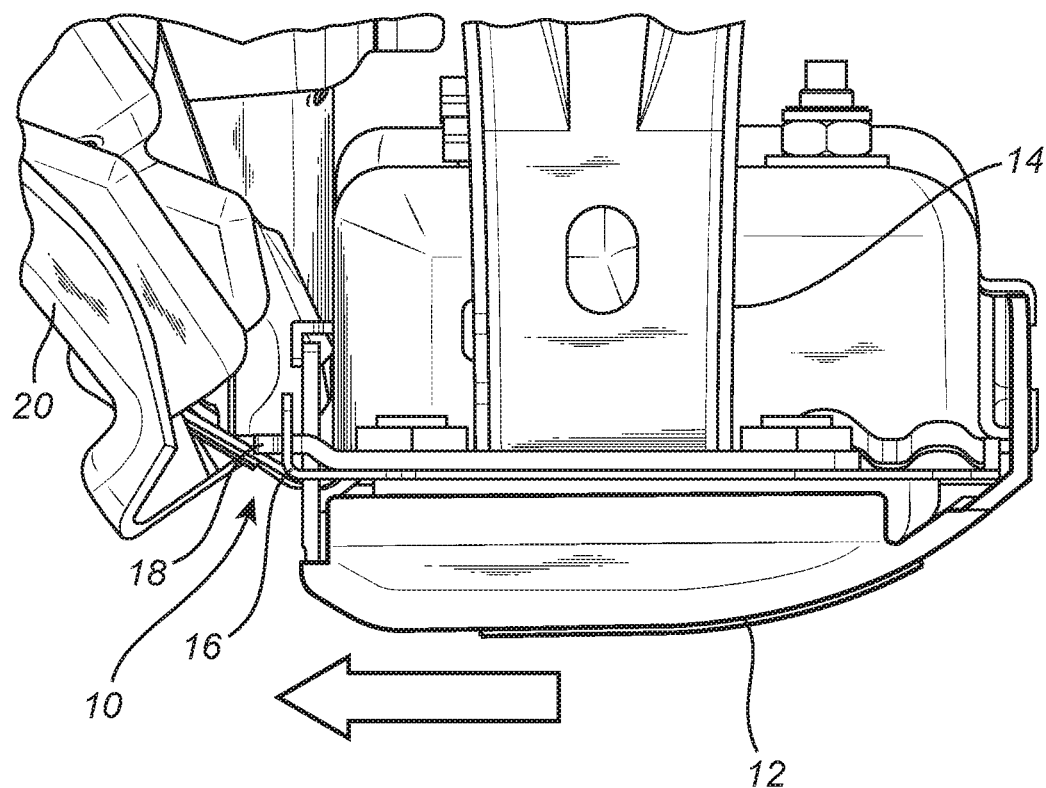
(Prior Art) *Fig. 3*
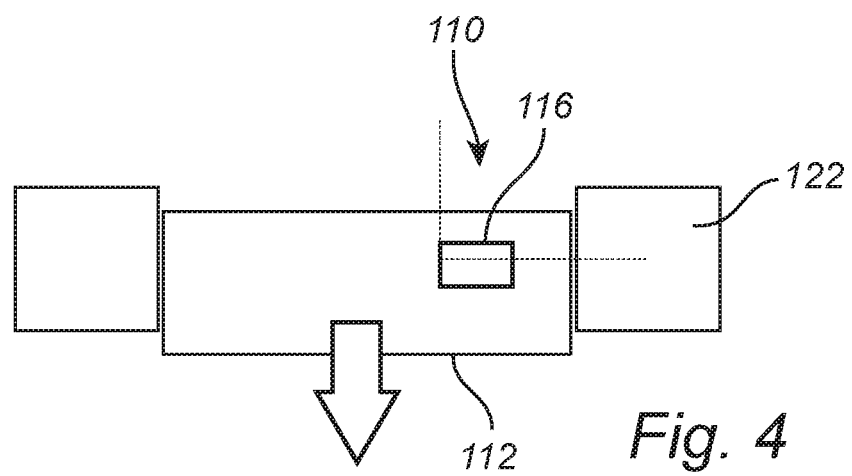
*Fig. 4*

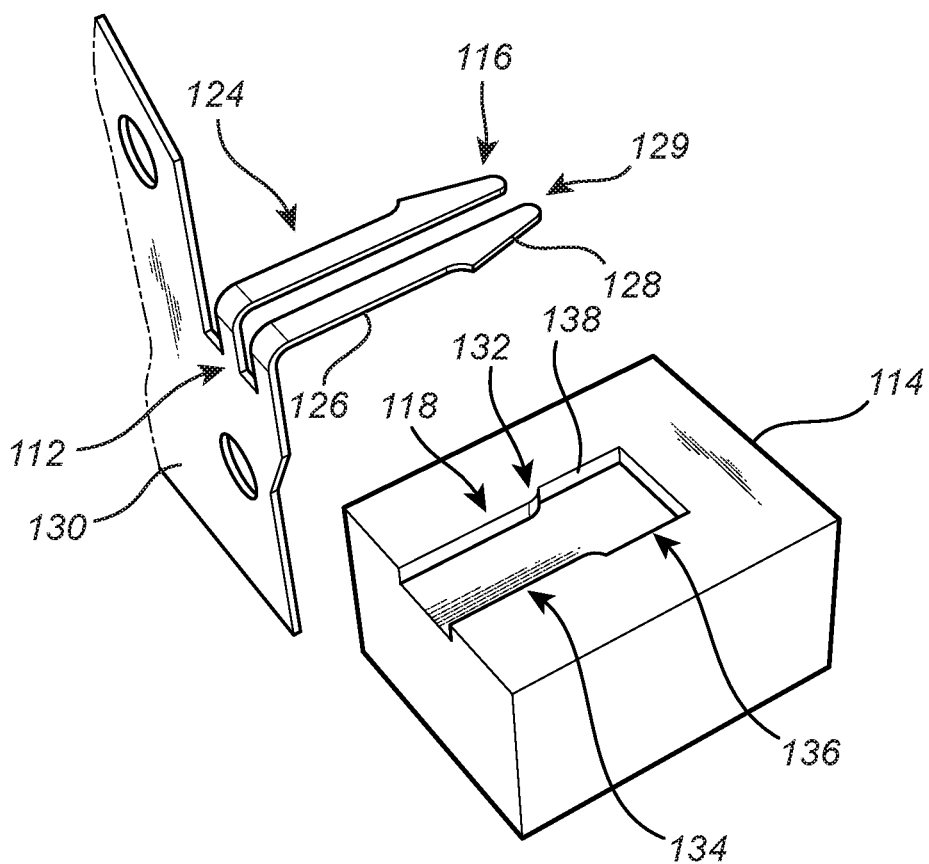
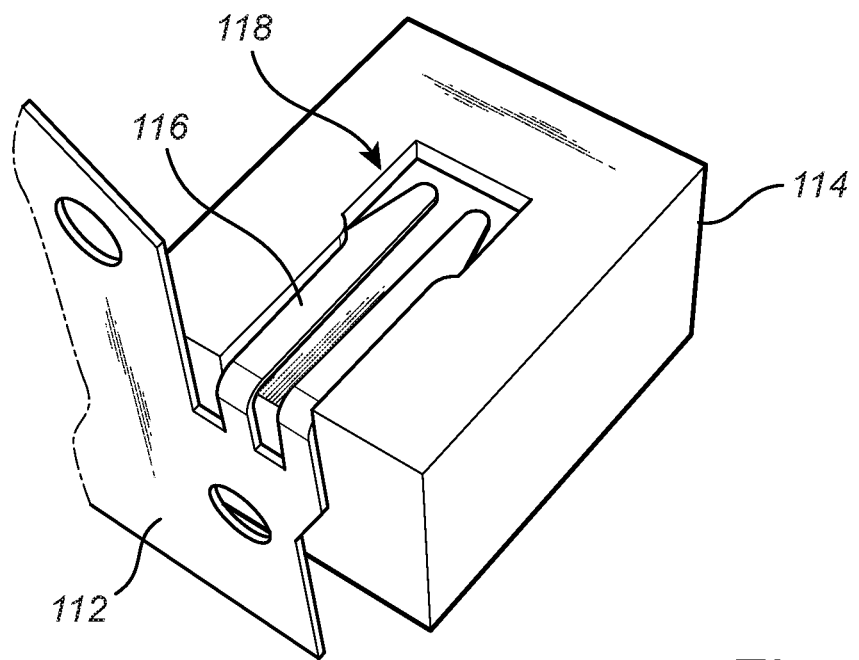
Fig. 5

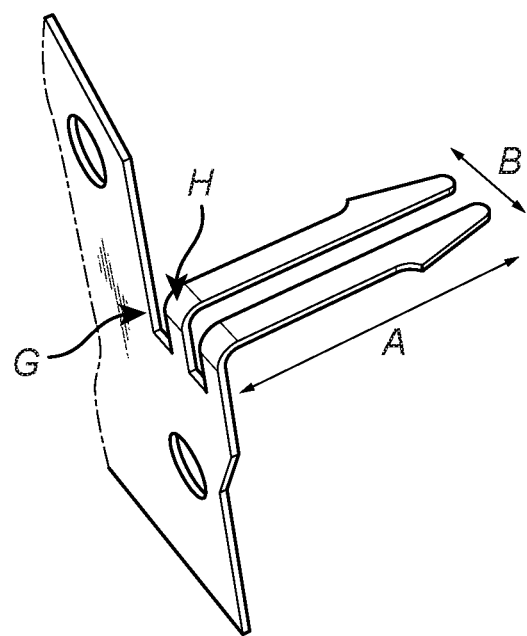
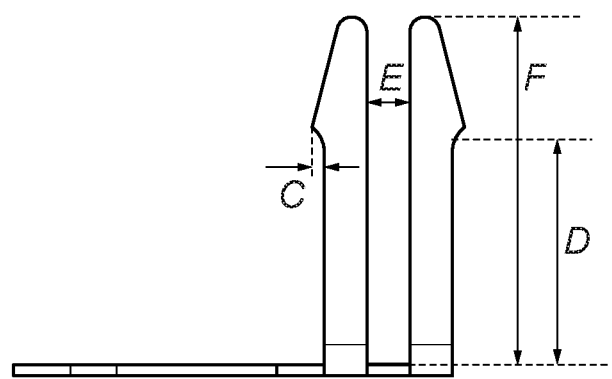
Fig. 7

CLIP ASSEMBLY FOR HOLDING A COMPONENT DURING A VEHICLE ASSEMBLY/DISASSEMBLY PROCESS

TECHNICAL FIELD

The present disclosure relates generally to the automotive field. More specifically, the present disclosure relates to a clip assembly for holding a component during a vehicle assembly/disassembly process.

BACKGROUND

During a vehicle assembly process, it is important from efficiency and cost perspectives that a component be easy to mount to an associated structure by a single assembler. Likewise, during a vehicle service process, it is important from efficiency and cost perspectives that the component be easy to dismount from the associated structure by a single service technician, without the need to disassemble surrounding components. Often, a "third hand" solution is utilized for these purposes, typically consisting of a hanger loop coupled to the component and a corresponding retention tab coupled to the associated structure (or vice versa). The hanger loop is engaged with the retention tab when the component is disposed in position adjacent to the associated structure, holding the component in place while more permanent fixations, such as bolts, fasteners, and/or the like, are applied or removed. In this sense, the "third hand" solution holds the component in place while the assembler or service technician fastens or unfastens it. Typically, these "third hand" solutions hold the component along two axes, with limited securement along the third axis.

FIGS. 1-3 illustrate such a "third hand" solution 10 in the context of the assembly of a knee airbag module 12 to an associated structure 14. The knee airbag module 12 includes a metal hanger loop 16 that is engaged with a corresponding metal retention tab 18 coupled to the associated structure 14 when the knee airbag module 12 is disposed in place. This effectively temporarily holds the knee airbag module 12 along two axes, with limited securement along the third axis, allowing the knee airbag module 12 to be translated in one insertion/removal direction with respect to the associated structure 14. However, as illustrated in FIG. 3, removal of the knee airbag module 12 along this open axis is obstructed by the instrument panel 20 of the vehicle. Having to remove this instrument panel 20 prior to removing the knee airbag module 12 would disadvantageously add 15-20 minutes to a service session. Therefore, it is preferable that the knee airbag module 12 is removable along another axis, such that the instrument panel 20 does have to be first removed. Conventional "third hand" solutions, however, do not allow this.

Thus, what is still needed in the art is a "third hand" solution that holds a component along three axis, with securement along one of the axes being selectively enabled/disabled.

SUMMARY

In various exemplary embodiments, the present disclosure provides a clip assembly for holding a component during a vehicle assembly/disassembly process. This clip assembly includes a clip structure coupled to one of a component and an associated structure of a vehicle and a corresponding receptacle structure manufactured into the other of the component and the associated structure of the vehicle. When the clip structure is engaged with the corresponding receptacle structure, the clip assembly holds the component with respect to the associated structure along three (orthogonal) axes, preventing translation of the component with respect to the associated structure in one or both directions along each axis. Along one of the axes, the engagement of the clip structure with the corresponding receptacle structure can be overcome by the application of a sufficiently high force to the component, thereby disengaging the clip structure from the corresponding receptacle structure and the component from the associated structure. This engagement/disengagement force is applied along the axis of engagement/disengagement of the clip structure with the corresponding receptacle structure. Thus, the clip assembly effectively provides a "third hand" solution that holds the component in place while an assembler or service technician fastens or unfastens it from the associated structure. Preferably, the axis of engagement/disengagement of the clip structure with the corresponding receptacle structure is selected such that the component can be placed/removed and assembled/disassembled to/from the associated structure without interference from surrounding structures.

Preferably, the clip structure includes a one or more locking arms each including a barbed end structure. The receptable structure includes a locking slot defining one or more locking chambers that are designed to interact with the barbed end structure(s). In this manner, when the sufficiently high engagement/disengagement force is applied to the component and clip structure and the one or more locking arms are inserted into/removed from the locking slot, the one or more locking arms are deflected slightly and the barbed end structure(s) interact with the one or more locking chambers. When the clip structure is fully inserted into the corresponding receptacle structure, the one or more locking arms are relaxed and the barbed end structure(s) assume a locking configuration within the one or more locking chambers, thereby holding the clip structure in the associated receptacle structure until the sufficiently high disengagement force is applied to the component and clip structure to again slightly deflect the one or more locking arms and the barbed end structure(s), dislodging the barbed end structure(s) from the one or more locking chambers. It should be noted that one or multiple clip structures and receptacle structures can be used to hold each component. It should also be noted that the clip structure(s) and receptacle structure(s) can interact elastically, making the associated assembly reusable, or plastically, making the associated assembly non-reusable.

In one exemplary embodiment, a clip assembly is provided for holding a component adjacent to a structure of a vehicle while the component is being assembled to or disassembled from the structure of the vehicle, the clip assembly including: a clip structure coupled to the component, the clip structure adapted to engage a corresponding receptacle structure formed on a surface of, formed within, or coupled to the structure of the vehicle; wherein, when engaged, the clip structure is adapted to interact with the receptacle structure to constrain translation of the component with respect to the structure of the vehicle in one or more directions along three orthogonal axes; and wherein, when a force sufficient to deflect the clip structure within the receptacle structure is applied to clip structure in one direction along one of the three orthogonal axes, the clip structure is adapted to be disengaged from the receptacle structure in the one direction along the one of the three orthogonal axes. The clip structure includes one or more deflectable arm members each including a barbed structure, the barbed structure adapted to interact with a corresponding access slot and locking chamber defined by the receptacle structure, thereby securing the clip structure within the receptacle structure when the barbed structure is disposed entirely within the locking chamber. Optionally, the clip structure includes a pair of parallel deflectable arm members each including the barbed structure, the barbed structures adapted to interact with the corresponding access slot and locking chamber defined by the receptacle structure, thereby securing the clip structure within the receptacle structure when the barbed structures are disposed entirely within the locking chamber. Optionally, the barbed structures are asymmetrical. Optionally, the clip structure further includes a resilient material disposed between the pair of parallel deflectable arm members. Optionally, when engaged, translation of the clip structure with respect to the receptacle structure is unconstrained in one direction along another of the three orthogonal axes. Optionally, the clip structure is disposed substantially perpendicular to a surface of the component that is disposed adjacent to the structure of the vehicle when the component is assembled to or disassembled from the structure of the vehicle.

In another exemplary embodiment, a clip assembly is provided for holding a component adjacent to a structure of a vehicle while the component is being assembled to or disassembled from the structure of the vehicle, the clip assembly including: a receptacle structure formed on a surface of, formed within, or coupled to the structure of the vehicle, the receptacle structure adapted to receive a corresponding clip structure coupled to the component; wherein, when received, the receptacle structure is adapted to interact with the clip structure to constrain translation of the component with respect to the structure of the vehicle in one or more directions along three orthogonal axes; and wherein, when a force sufficient to deflect the clip structure within the receptacle structure is applied to clip structure in one direction along one of the three orthogonal axes, the clip structure is adapted to be disengaged from the receptacle structure in the one direction along the one of the three orthogonal axes. Generally, the receptacle structure defines an access slot and a locking chamber separated by a shoulder structure. The clip structure includes one or more deflectable arm members each including a barbed structure, the barbed structure adapted to interact with the access slot, locking chamber, and shoulder structure defined by the receptacle structure, thereby securing the clip structure within the receptacle structure when the barbed structure is disposed entirely within the locking chamber. Optionally, the clip structure includes a pair of parallel deflectable arm members each including the barbed structure, the barbed structures adapted to interact with the access slot, locking chamber, and shoulder structure defined by the receptacle structure, thereby securing the clip structure within the receptacle structure when the barbed structures are disposed entirely within the locking chamber. Optionally, the locking chamber is asymmetrical with respect to the access slot. Optionally, the clip structure further includes a resilient material disposed between the pair of parallel deflectable arm members. Optionally, when received, translation of the clip structure with respect to the receptacle structure is unconstrained in one direction along another of the three orthogonal axes. Optionally, the receptacle structure is oriented substantially perpendicular to a surface of the structure of the vehicle that is disposed adjacent to the component when the component is assembled to or disassembled from the structure of the vehicle.

In a further exemplary embodiment, a component assembly of a vehicle is provided, the component assembly including: a structure; a component disposed adjacent to the structure; a clip structure coupled to one of the component and the structure; a receptacle structure formed on a surface of, formed within, or coupled to the other of the component and the structure; wherein the clip structure adapted to engage the receptacle structure; wherein, when engaged, the clip structure is adapted to interact with the receptacle structure to constrain translation of the component with respect to the structure in one or more directions along three orthogonal axes; and wherein, when a force sufficient to deflect the clip structure within the receptacle structure is applied to clip structure in one direction along one of the three orthogonal axes, the clip structure is adapted to be disengaged from the receptacle structure in the one direction along the one of the three orthogonal axes. The clip structure comprises one or more deflectable arm members each including a barbed structure, the barbed structure adapted to interact with a corresponding access slot and locking chamber defined by the receptacle structure, thereby securing the clip structure within the receptacle structure when the barbed structure is disposed entirely within the locking chamber. Optionally, the clip structure comprises a pair of parallel deflectable arm members each including the barbed structure, the barbed structures adapted to interact with the corresponding access slot and locking chamber defined by the receptacle structure, thereby securing the clip structure within the receptacle structure when the barbed structures are disposed entirely within the locking chamber. Optionally, when engaged, translation of the clip structure with respect to the receptacle structure is unconstrained in one direction along another of the three orthogonal axes. Optionally, the clip structure is disposed substantially perpendicular to a surface of the one of the component or structure that is disposed adjacent to the other of the component or structure when the component is assembled to or disassembled from the structure and the receptacle structure is oriented substantially perpendicular to a surface of the other of the component or structure that is disposed adjacent to the one of the component or structure when the component is assembled to or disassembled from the structure.

BRIEF DESCRIPTION OF THE DRAWINGS

The present disclosure is illustrated and described herein with reference to the various drawings, in which like reference numbers are used to denote like assembly components/method steps, as appropriate, and in which:

FIG. 1 is a perspective view of a knee airbag module coupled to the associated structure of a vehicle using a conventional "third hand" solution;

FIG. 2 is a planar view of a knee airbag module coupled to the associated structure of a vehicle using a conventional "third hand" solution;

FIG. 3 is another planar view of a knee airbag module coupled to the associated structure of a vehicle using a conventional "third hand" solution;

FIG. 4 is a schematic diagram illustrating the principle of operation of the clip assembly provided herein;

FIG. 5 is an exploded perspective view of one exemplary embodiment of the clip assembly provided herein, including the clip structure and the associated receptacle structure in disassembled and assembled configurations;

FIG. 7 is a perspective and planar view of one exemplary embodiment of the clip structure provided herein;

DESCRIPTION OF EMBODIMENTS

Figure 6:
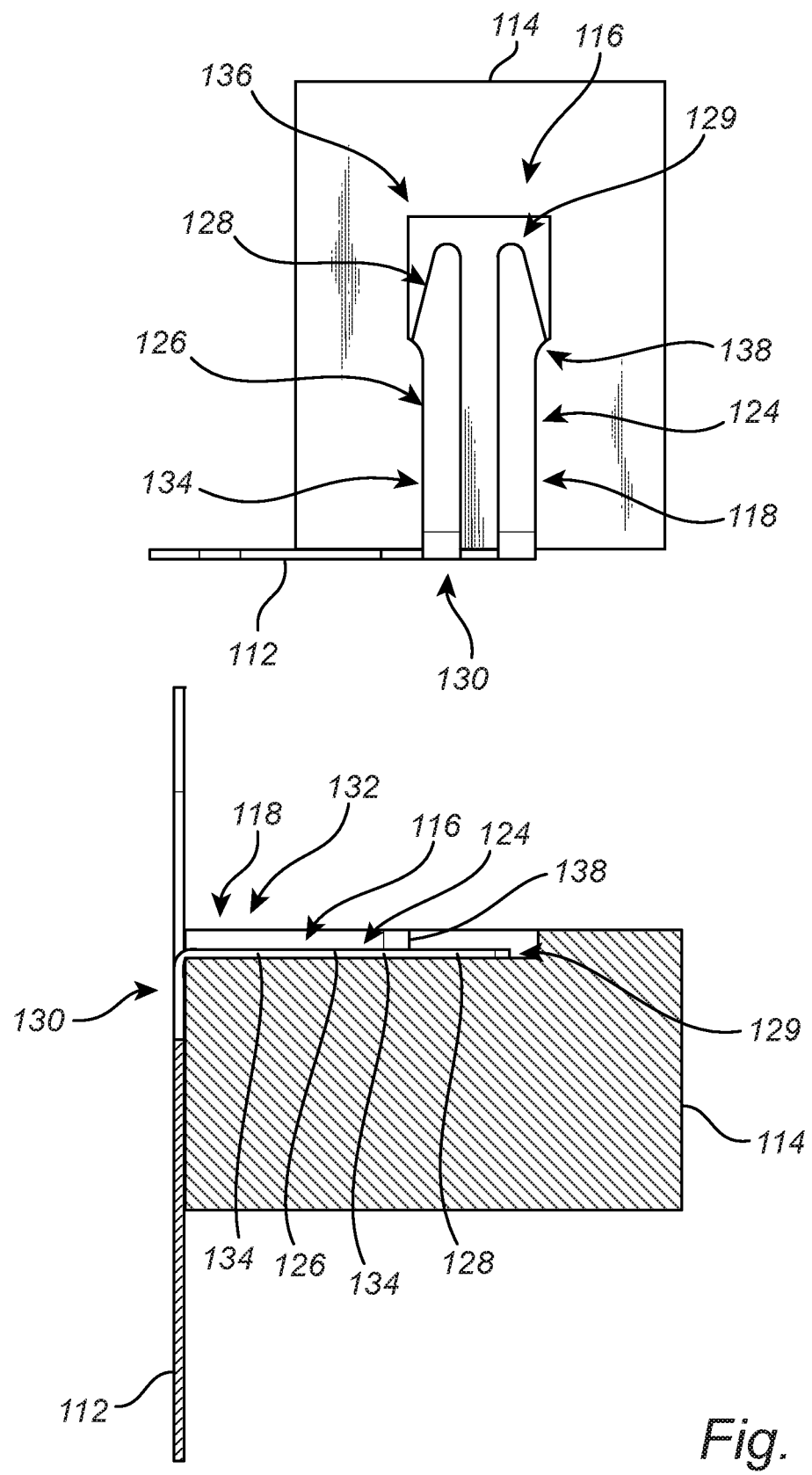
FIG. 6 is a planar view of one exemplary embodiment of the clip assembly provided herein, including the clip structure and the associated receptacle structure in an assembled configuration.

Again, in various exemplary embodiments, the present disclosure provides a clip assembly for holding a component during a vehicle assembly/disassembly process. This clip assembly includes a clip structure coupled to one of a component and an associated structure of a vehicle and a corresponding receptacle structure manufactured into the other of the component and the associated structure of the vehicle. When the clip structure is engaged with the corresponding receptacle structure, the clip assembly holds the component with respect to the associated structure along three (orthogonal) axes, preventing translation of the component with respect to the associated structure in one or both directions along each axis. Along one of the axes, the engagement of the clip structure with the corresponding receptacle structure can be overcome by the application of a sufficiently high force to the component, thereby disengaging the clip structure from the corresponding receptacle structure and the component from the associated structure. This engagement/disengagement force is applied along the axis of engagement/disengagement of the clip structure with the corresponding receptacle structure. Thus, the clip assembly effectively provides a "third hand" solution that holds the component in place while an assembler or service technician fastens or unfastens it from the associated structure. Preferably, the axis of engagement/disengagement of the clip structure with the corresponding receptacle structure is selected such that the component can be placed/removed and assembled/disassembled to/from the associated structure without interference from surrounding structures.

Preferably, the clip structure includes a one or more locking arms each including a barbed end structure. The receptable structure includes a locking slot defining one or more locking chambers that are designed to interact with the barbed end structure(s). In this manner, when the sufficiently high engagement/disengagement force is applied to the component and clip structure and the one or more locking arms are inserted into/removed from the locking slot, the one or more locking arms are deflected slightly and the barbed end structure(s) interact with the one or more locking chambers. When the clip structure is fully inserted into the corresponding receptacle structure, the one or more locking arms are relaxed and the barbed end structure(s) assume a locking configuration within the one or more locking chambers, thereby holding the clip structure in the associated receptacle structure until the sufficiently high disengagement force is applied to the component and clip structure to again slightly deflect the one or more locking arms and the barbed end structure(s), dislodging the barbed end structure(s) from the one or more locking chambers. It should be noted that one or multiple clip structures and receptacle structures can be used to hold each component.

It should be noted that, throughout the following description, the clip structure provided herein can alternatively be coupled to or associated with a "structure" of the vehicle, as opposed to a "component," and the receptable structure provided herein can be coupled to or associated with a "component" of the vehicle, as opposed to the "structure," these parts/labels being freely and intentionally interchangeable for all purposes. Further, any "structure" may also include a part coupled to an underlying structural member.

FIG. 4 is a schematic diagram illustrating the principle of operation of the clip assembly 110 provided herein. As can be seen, the clip structure 116 of the clip assembly 110 holds the component 112 with respect to the associated structure (not illustrated) along three (orthogonal) axes, preventing translation of the component 112 with respect to the associated structure in one or both directions along each axis. Along one of the axes, the engagement of the clip structure 116 with the corresponding receptacle structure (not illustrated) can be overcome by the application of a sufficiently high force to the component 112, thereby disengaging the clip structure 116 from the corresponding receptacle structure and the component 112 from the associated structure. This engagement/disengagement force is applied along the axis of engagement/disengagement of the clip structure 116 with the corresponding receptacle structure. Thus, the clip assembly 110 effectively provides a "third hand" solution that holds the component 112 in place while an assembler or service technician fastens or unfastens it from the associated structure. Preferably, the axis of engagement/disengagement of the clip structure 116 with the corresponding receptacle structure is selected such that the component 112 can be placed/removed and assembled/disassembled to/from the associated structure without interference from surrounding structures 122.

Referring now specifically to FIG. 5, in one exemplary embodiment, the clip structure 116 is attached to or integrally formed with the component 112 or a part of the component 112. The clip structure 116 may be manufactured from a metal, a plastic, a polymer, or any other suitable material that provides adequate strength and rigidity, but a desired degree of flexibility. The clip structure 116 includes a one or more locking arms 124, each including an elongate portion 126 and a barbed end structure 128. The elongate portion 126 and the barbed end structure 128 can be substantially planar structures or utilize other suitable cross-sectional shapes as desired. Preferably, the barbed end structure 128 includes a tapered and/or rounded end portion 129 for facilitating eventual insertion into the corresponding receptacle structure 118. In the exemplary embodiment illustrated, the clip structure 116 utilizes a pair of parallel locking arms 124 and the associated elongate portions 126 are attached to or integrally formed with part of the component 112 via a pair of angle portions 130, in this case forming substantially right angles with the remainder of each locking arm 124. These split angle portions 130 provide a desired degree of flexibility and "spring" to the elongate portions 126 of the locking arms 124. In the exemplary embodiment illustrated, the barbed end structures 128 include outboard barbs only, with substantially flat inboard surfaces.

The receptable structure 118 is formed in an interior portion or on an exterior surface of the associated structure 114 or formed in an interior portion or on an exterior surface of a member coupled to the associated structure 114. The receptacle structure 118 may be manufactured from a metal, a plastic, a polymer, or any other suitable material that provides adequate strength and rigidity, and, optionally, a desired degree of flexibility. The receptacle structure 118 defines a locking slot 132 that includes an access slot 134 and one or more locking chambers 136 that are designed to interact with the barbed end structure(s) 128. In the exemplary embodiment illustrated, the access slot 134 is narrowed relative to the single, rectangular locking chamber 136 utilized. Further, the locking slot 132 is shown without a "roof," meaning that the receptacle structure 118 provides an additional degree of freedom in one direction along one axis. A "roof" may of course bet utilized, eliminating this additional degree of freedom. In general, when a sufficiently high engagement/disengagement force is applied to the component 112 and clip structure 116 and the locking arms 124 are inserted into/removed from the locking slot 132, the locking arms 124 are deflected together slightly and the barbed end structures 128 interact with the opening of the locking chamber 136. When the clip structure 116 is fully inserted into the locking slot 132, the locking arms 124 are relaxed and the barbed end structures 128 assuming a locking configuration within the locking chamber 136, with the barbed end structures 128 being generally prevented from backing out of the locking chamber 136 by a shoulder structure 138 disposed on either side of the opening of the locking chamber 136 at the junction of the access slot 134, thereby holding the clip structure 116 in the associated receptacle structure 118 until the sufficiently high disengagement force is applied to the component 112 and clip structure 116 to again slightly deflect the locking arms 126 and the barbed end structures 128 together, dislodging the barbed end structures 128 from the shoulder structures 138 and locking chamber 136. It should again be noted that one or multiple clip structures 116 and receptacle structures 118 can be used to hold each component 112. Further, it should be noted that the clip structure 116 can alternatively be coupled to or associated with the structure 114 of the vehicle and the receptable structure 118 can be coupled to or associated with the component 112 of the vehicle, these parts being interchangeable without departing from the spirit or scope of the present disclosure.

Referring now specifically to FIG. 6, in one exemplary embodiment, the clip structure 116 is attached to or integrally formed with the component 112 or a part of the component 112. The clip structure 116 may be manufactured from a metal, a plastic, a polymer, or any other suitable material that provides adequate strength and rigidity, but a desired degree of flexibility. The clip structure 116 includes a one or more locking arms 124, each including an elongate portion 126 and a barbed end structure 128. The elongate portion 126 and the barbed end structure 128 can be substantially planar structures or utilize other suitable cross-sectional shapes as desired. Preferably, the barbed end structure 128 includes a tapered and/or rounded end portion 129 for facilitating eventual insertion into the corresponding receptacle structure 118. In the exemplary embodiment illustrated, the clip structure 116 utilizes a pair of parallel locking arms 124 and the associated elongate portions 126 are attached to or integrally formed with part of the component 112 via a pair of angle portions 130, in this case forming substantially right angles with the remainder of each locking arm 124. These split angle portions 130 provide a desired degree of flexibility and "spring" to the elongate portions 126 of the locking arms 124. In the exemplary embodiment illustrated, the barbed end structures 128 include outboard barbs only, with substantially flat inboard surfaces.

The receptacle structure 118 is formed in an interior portion or on an exterior surface of the associated structure 114 or formed in an interior portion or on an exterior surface of a member coupled to the associated structure 114. The receptacle structure 118 may be manufactured from a metal, a plastic, a polymer, or any other suitable material that provides adequate strength and rigidity, and, optionally, a desired degree of flexibility. The receptacle structure 118 defines a locking slot 132 that includes an access slot 134 and one or more locking chambers 136 that are designed to interact with the barbed end structure(s) 128. In the exemplary embodiment illustrated, the access slot 134 is narrowed relative to the single, rectangular locking chamber 136 utilized. Further, the locking slot 132 is shown without a "roof," meaning that the receptacle structure 118 provides an additional degree of freedom in one direction along one axis. A "roof" may of course bet utilized, eliminating this additional degree of freedom. In general, when a sufficiently high engagement/disengagement force is applied to the component 112 and clip structure 116 and the locking arms 124 are inserted into/removed from the locking slot 132, the locking arms 124 are deflected together slightly and the barbed end structures 128 interact with the opening of the locking chamber 136. When the clip structure 116 is fully inserted into the locking slot 132, the locking arms 124 are relaxed and the barbed end structures 128 assuming a locking configuration within the locking chamber 136, with the barbed end structures 128 being generally prevented from backing out of the locking chamber 136 by a shoulder structure 138 disposed on either side of the opening of the locking chamber 136 at the junction of the access slot 134, thereby holding the clip structure 116 in the associated receptacle structure 118 until the sufficiently high disengagement force is applied to the component 112 and clip structure 116 to again slightly deflect the locking arms 126 and the barbed end structures 128 together, dislodging the barbed end structures 128 from the shoulder structures 138 and locking chamber 136. It should again be noted that one or multiple clip structures 116 and receptacle structures 118 can be used to hold each component 112. Further, it should again be noted that the clip structure 116 can alternatively be coupled to or associated with the structure 114 of the vehicle and the receptable structure 118 can be coupled to or associated with the component 112 of the vehicle, these parts being interchangeable without departing from the spirit or scope of the present disclosure.

FIG. 7 illustrates how the stiffness of the clip structure 116 may be controlled to accommodate components 112 (FIGS. 4-6)/structures 114 (FIGS. 5 and 6) of different mass. In addition to the type and thickness of material used, the following will affect the stiffness of the clip structure 116: length of the feature (A); width of the feature (B); size of the feature step (C); height of the feature step (D); width of the cut splitting the feature (E); length of the cut splitting the feature (F); length of the cut on the side of the feature (G); and shape of the bending point of the feature (H).

Figure 8:
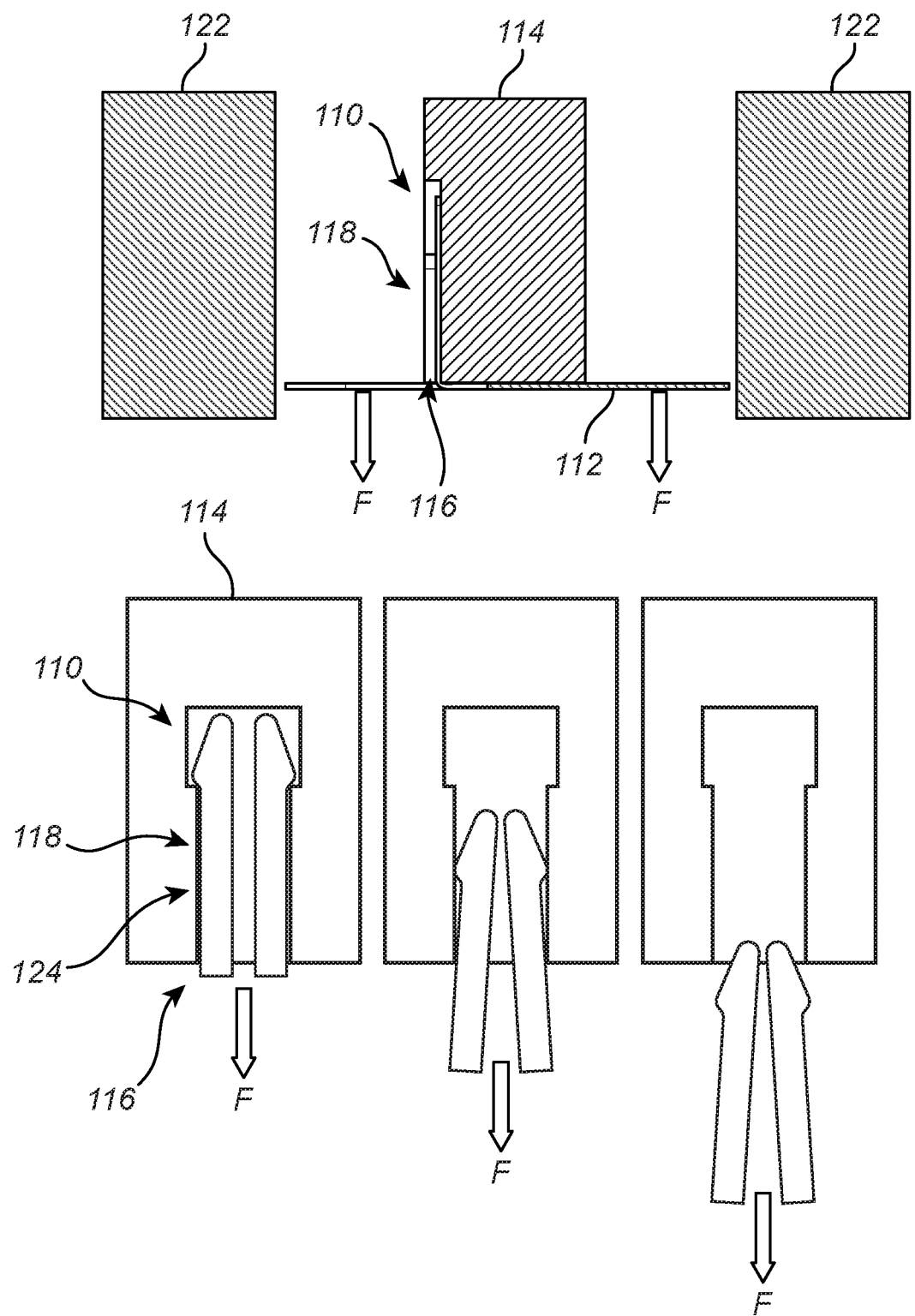
FIG. 8 is a planar view of one exemplary embodiment of the clip assembly provided herein, including the clip structure and the associated receptacle structure in disassembled and assembled configurations.

FIG. 8 illustrates that, using the clip assembly 110 of the present disclosure in a service setting, for example, the service technician can pull the component 112 in a predetermined direction. The force (F) applied forces the clip structure 116 to compress (and/or deflect), at which point the clip structure 116 can be pulled from the receptacle structure 118 and the component 112 separated from the associated structure 114, without having to remove the surrounding components 122. Movement in some or all other directions is otherwise constrained by the clip assembly 110 and the adjacency of the component 112 and the associated structure 114.

Figure 9:
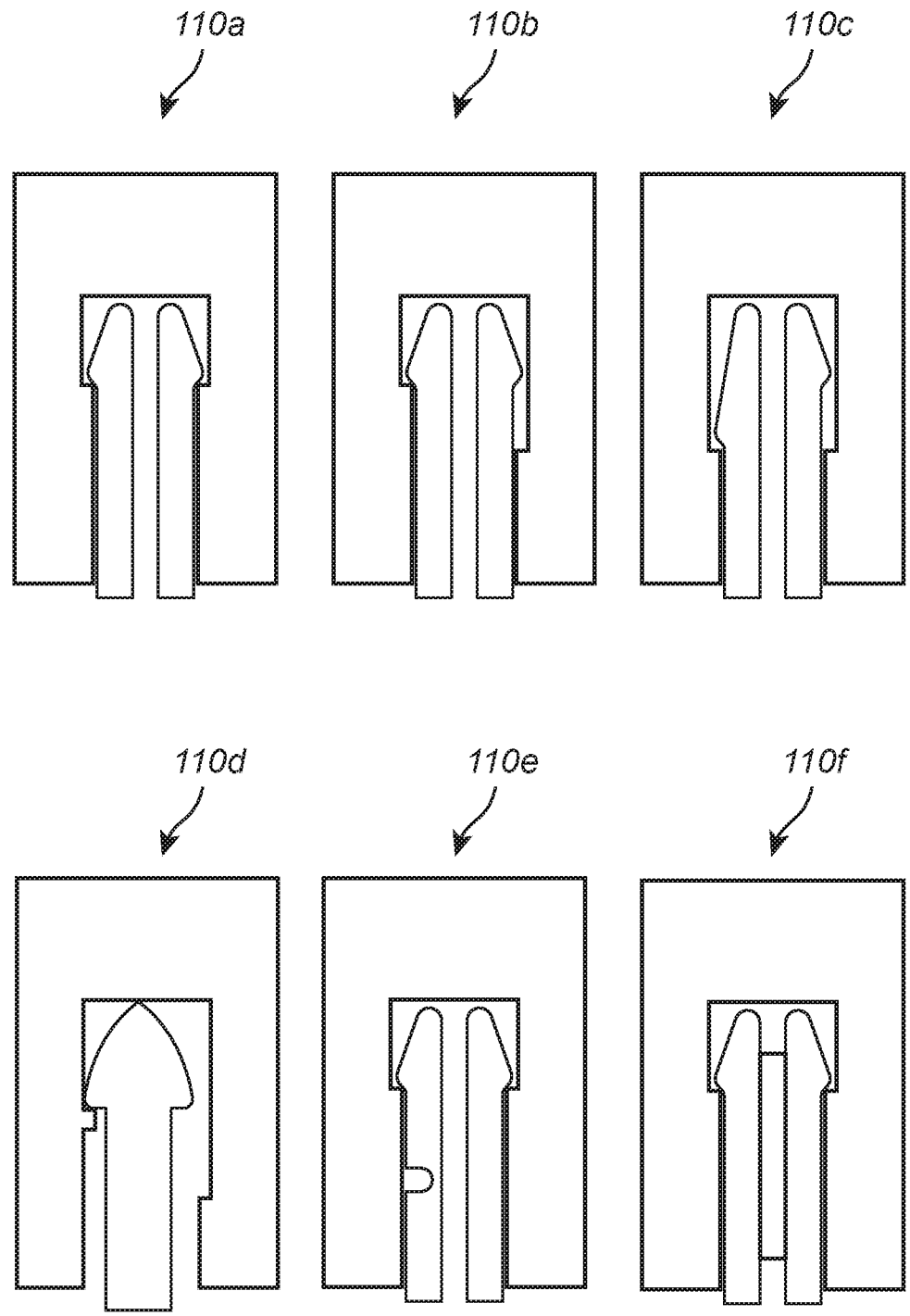
FIG. 9 is a planar view of alternative embodiments of the clip assembly provided herein, including the clip structure and the associated receptacle structure in an assembled configuration.

FIG. 9 provides various non-limiting exemplary clip structure/retention structure configurations that may be utilized, including: a symmetrical feature with a symmetrical interface 110a; a symmetrical feature with an asymmetrical interface that distributes the applied force (F) over two steps 110b; an asymmetrical feature with a symmetrical interface that also distributes the applied force (F) over two steps 110c; a single-arm feature with an asymmetrical interface that requires back and forth bending of the single-arm feature and distributes the applied force (F) over two steps 110d; a notched feature with a symmetrical interface that reduces stiffness and reduces the applied force (F) 110e; and a partially-resilient feature with a symmetrical interface that increases and controls stiffness and the applied force (F) 110f.

Figure 10:
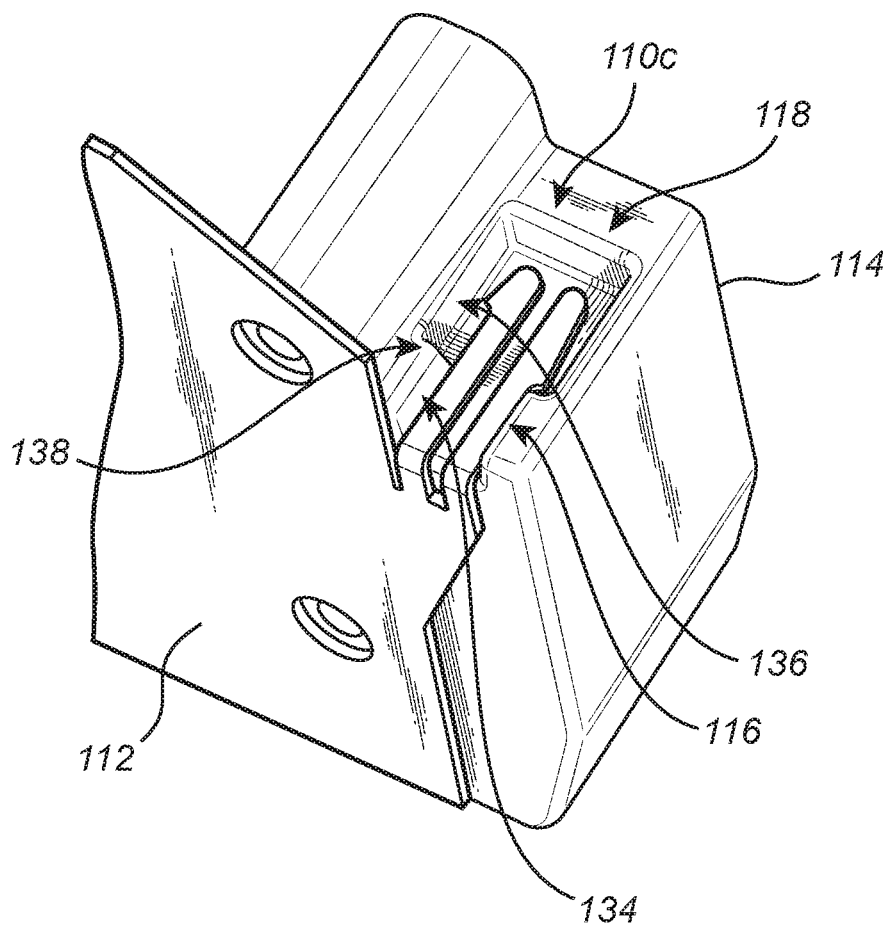
FIG. 10 is a perspective view of another exemplary embodiment of the clip assembly provided herein, including the clip structure and the associated receptacle structure in an assembled configuration.

Finally, FIG. 10 is a perspective view of another exemplary embodiment of the clip assembly 110c provided herein, including the clip structure 116 and the associated receptacle structure 118 in an assembled configuration. Here, a "roofless" receptacle structure 118 is used, with the edges of the access slot 134, locking chamber 16, and intervening shoulder structures 138 being rounded for easy insertion of the clip structure 116 into the associated receptacle structure 118 from the open side. In this case, an asymmetrical clip structure 116 is utilized. It should be noted that the pullout functionality described herein above is still applicable in a direction perpendicular to the open insertion side.

This, again, in various exemplary embodiments, the present disclosure provides a clip assembly for holding a component during a vehicle assembly/disassembly process. This clip assembly includes a clip structure coupled to one of a component and an associated structure of a vehicle and a corresponding receptacle structure manufactured into the other of the component and the associated structure of the vehicle. When the clip structure is engaged with the corresponding receptacle structure, the clip assembly holds the component with respect to the associated structure along three (orthogonal) axes, preventing translation of the component with respect to the associated structure in one or both directions along each axis. Along one of the axes, the engagement of the clip structure with the corresponding receptacle structure can be overcome by the application of a sufficiently high force to the component, thereby disengaging the clip structure from the corresponding receptacle structure and the component from the associated structure. This engagement/disengagement force is applied along the axis of engagement/disengagement of the clip structure with the corresponding receptacle structure. Thus, the clip assembly effectively provides a "third hand" solution that holds the component in place while an assembler or service technician fastens or unfastens it from the associated structure. Preferably, the axis of engagement/disengagement of the clip structure with the corresponding receptacle structure is selected such that the component can be placed/removed and assembled/disassembled to/from the associated structure without interference from surrounding structures.

Preferably, the clip structure includes a one or more locking arms each including a barbed end structure. The receptacle structure includes a locking slot defining one or more locking chambers that are designed to interact with the barbed end structure(s). In this manner, when the sufficiently high engagement/disengagement force is applied to the component and clip structure and the one or more locking arms are inserted into/removed from the locking slot, the one or more locking arms are deflected slightly and the barbed end structure(s) interact with the one or more locking chambers. When the clip structure is fully inserted into the corresponding receptacle structure, the one or more locking arms are relaxed and the barbed end structure(s) assume a locking configuration within the one or more locking chambers, thereby holding the clip structure in the associated receptacle structure until the sufficiently high disengagement force is applied to the component and clip structure to again slightly deflect the one or more locking arms and the barbed end structure(s), dislodging the barbed end structure(s) from the one or more locking chambers. It should be noted that one or multiple clip structures and receptacle structures can be used to hold each component.

It is also contemplated herein that the deflectable arm-based clip structure provided herein can also be replaced with a resilient member clip structure or the like that may be inserted into a receptacle structure and resist backing out. Further, it should again be noted that the clip structure provided herein can alternatively be coupled to or associated with a "structure" of the vehicle, as opposed to a "component," and the receptacle structure provided herein can be coupled to or associated with a "component" of the vehicle, as opposed to the "structure," these parts/labels being freely and intentionally interchangeable for all purposes, including in the following non-limiting claims. Still further, any "structure" may also include a part coupled to an underlying structural member.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

What is claimed is:

1. A clip assembly for holding a component adjacent to a structure while the component is being assembled to or disassembled from the structure, the clip assembly comprising:
    a clip structure adapted to be coupled to the component, the clip structure adapted to engage a corresponding receptacle structure formed on a surface of, formed within, or coupled to the structure;
    wherein, when engaged, the clip structure is adapted to interact with the receptacle structure to constrain translation of the component with respect to the structure in one or more directions along three orthogonal axes;
    wherein, when engaged, translation of the clip structure with respect to the receptacle structure is unconstrained in one direction along another of the three orthogonal axes;
    wherein, when a force sufficient to deflect the clip structure elastically or plastically within the receptacle structure is applied to the clip structure in one direction along one of the three orthogonal axes, the clip structure is adapted to be disengaged from the receptacle structure in the one direction along the one of the three orthogonal axes; and
    wherein the clip structure comprises a pair of parallel deflectable arm members each comprising a downward protruding angle portion coupled to the component and disposed at a downward right angle to an elongate portion comprising a substantially flat inboard surface and a barbed structure disposed on a corresponding outboard surface of the elongate portion with each elongate portion ending in a tapered end portion of the associated deflectable arm member, wherein the downward protruding angle portions are oriented in a same direction and separate and spaced apart from one another.

2. The clip assembly of claim 1, wherein the elongate portion of each of the pair of parallel deflectable arm members is substantially planar in a plane including both the inboard surface and the outboard surface of each of the pair of parallel deflectable arm members.

3. The clip assembly of claim 1, wherein the barbed structures are adapted to interact with a corresponding access slot and locking chamber defined by the receptacle structure, thereby securing the clip structure within the receptacle structure when the barbed structures are disposed entirely within the locking chamber.

4. The clip assembly of claim 1, wherein the barbed structures are asymmetrical.

5. The clip assembly of claim 1, wherein the clip structure is disposed substantially perpendicular to a surface of the component that is disposed adjacent to the structure when the component is assembled to or disassembled from the structure.

6. The clip assembly of claim 1, wherein the downward protruding angle portion of each of the pair of parallel deflectable arm members is disposed substantially perpendicular to the associated elongate portion and oriented in the same direction.

7. The clip assembly of claim 6, wherein the downward protruding angle portion of each of the pair of parallel deflectable arm members is coupled to the associated elongate portion via an intervening bend portion.

8. The clip assembly of claim 7, wherein the intervening bend portion of each of the pair of parallel deflectable arm members provides the associated elongate portion with a predetermined stiffness with respect to the component.

9. A clip assembly for holding a component adjacent to a structure while the component is being assembled to or disassembled from the structure, the clip assembly comprising:
a receptacle structure comprising a floor disposed at a bottom thereof and adapted to be formed on a surface of, formed within, or coupled to the structure, the receptacle structure adapted to receive a corresponding clip structure coupled to the component;
wherein, when received, the receptacle structure is adapted to interact with a pair of elongate arms of the clip structure that each contact the floor disposed at the bottom thereof to constrain translation of the component with respect to the structure in one or more directions along three orthogonal axes, with the pair of elongate arms of the clip structure contacting the floor to constrain translation of the component downwards with respect to the structure;
wherein, when received, translation of the clip structure with respect to the receptacle structure is unconstrained in one direction along another of the three orthogonal axes;
wherein, when a force sufficient to deflect the clip structure elastically or plastically within the receptacle structure is applied to the clip structure in one direction along one of the three orthogonal axes, the clip structure is adapted to be disengaged from the receptacle structure in the one direction along the one of the three orthogonal axes; and
wherein the receptacle structure defines an access slot and a locking chamber separated by a shoulderstructure, wherein the floor is disposed within a bottom of the locking chamber beyond the access slot and shoulderstructure and is adapted to contact and support the clip structure when the clip structure is received by the receptacle structure.

10. The clip assembly of claim 9, wherein the one interior surface of the locking chamber is adapted to contact and support the clip structure vertically when the clip structure is received by the receptacle structure.

11. The clip assembly of claim 9, where the clip structure includes one or more deflectable arm members each including a barbed structure, the barbed structure adapted to interact with the access slot, locking chamber, and shoulder structure defined by the receptacle structure, thereby securing the clip structure within the receptacle structure when the barbed structure is disposed entirely within the locking chamber.

12. The clip assembly of claim 11, where the clip structure includes a pair of parallel deflectable arm members each including the barbed structure, the barbed structures adapted to interact with the access slot, locking chamber, and shoulder structure defined by the receptacle structure, thereby securing the clip structure within the receptacle structure when the barbed structures are disposed entirely within the locking chamber.

13. The clip assembly of claim 9, wherein the receptacle structure is oriented substantially perpendicular to a surface of the structure that is disposed adjacent to the component when the component is assembled to or disassembled from the structure.

14. A component assembly, the component assembly comprising:
a structure;
a component disposed adjacent to the structure;
a clip structure coupled to one of the component and the structure;
a receptacle structure formed on a surface of, formed within, or coupled to the other of the component and the structure;
wherein the clip structure is adapted to engage the receptacle structure;
wherein, when engaged, the clip structure is adapted to interact with the receptacle structure to constrain translation of the component with respect to the structure in one or more directions along three orthogonal axes;
wherein, when engaged, translation of the clip structure with respect to the receptacle structure is unconstrained in one direction along another of the three orthogonal axes;
wherein, when a force sufficient to deflect the clip structure elastically or plastically within the receptacle structure is applied to the clip structure in one direction along one of the three orthogonal axes, the clip structure is adapted to be disengaged from the receptacle structure in the one direction along the one of the three orthogonal axes; and
wherein the clip structure comprises a pair of parallel deflectable arm members each comprising a downward protruding angle portion coupled to the component and disposed at a downward right angle to an elongate portion comprising a substantially flat inboard surface and a barbed structure disposed on a corresponding outboard surface of the elongate portion with each elongate portion ending in a tapered end portion of the associated deflectable arm member, wherein the downward protruding angle portions are oriented in a same direction and separate and spaced apart from one another.

15. The component assembly of claim 14, wherein the elongate portion of each of the pair of parallel deflectable arm members is substantially planar in a plane including both the inboard surface and the outboard surface of each of the pair of parallel deflectable arm members.

16. The component assembly of claim 14, wherein the barbed structures are adapted to interact with a corresponding access slot and locking chamber defined by the receptacle structure, thereby securing the clip structure within the receptacle structure when the barbed structures are disposed entirely within the locking chamber.

17. The component assembly of claim 14, wherein the clip structure is disposed substantially perpendicular to a surface of the one of the component or structure that is disposed adjacent to the other of the component or structure when the component is assembled to or disassembled from the structure and the receptacle structure is oriented substantially perpendicular to a surface of the other of the component or structure that is disposed adjacent to the one of the component or structure when the component is assembled to or disassembled from the structure.

\* \* \* \* \*